J. BAUER.
FODDER TIE.
APPLICATION FILED JUNE 1, 1916. RENEWED APR. 24, 1918.
1,278,092.
Patented Sept. 10, 1918.
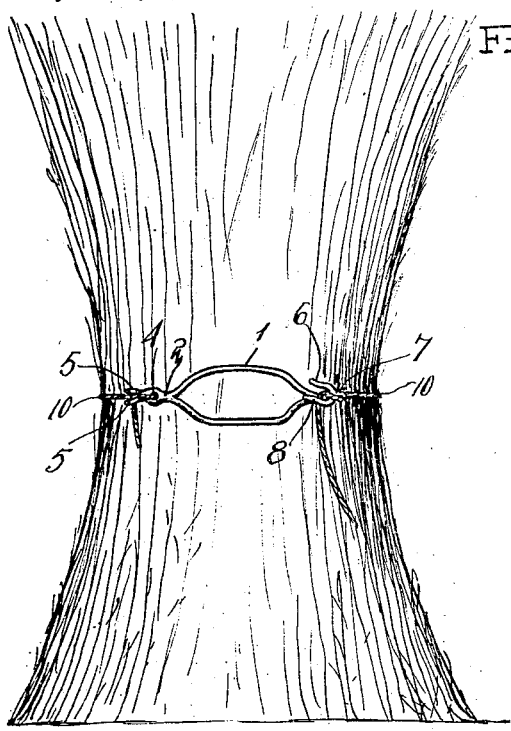
FIG. 1.
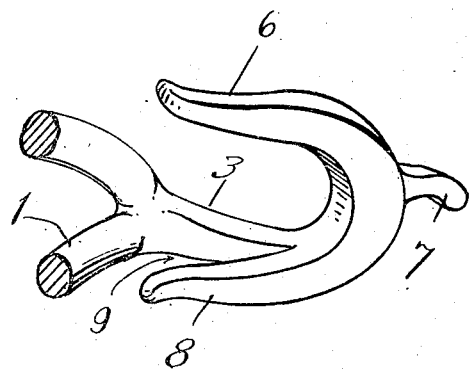
FIG. 4.
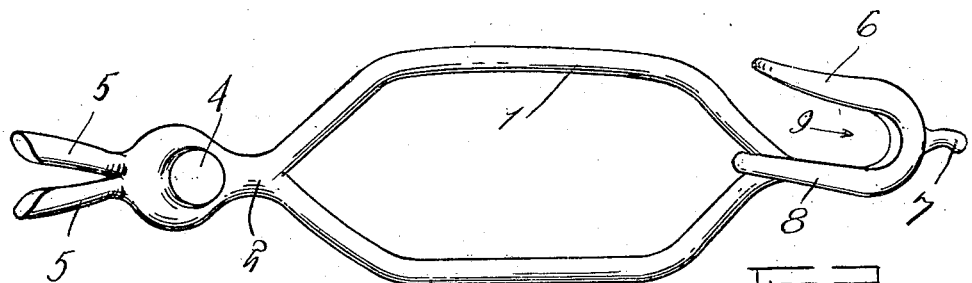
FIG. 2.
FIG. 3.
Inventor
J. Bauer.
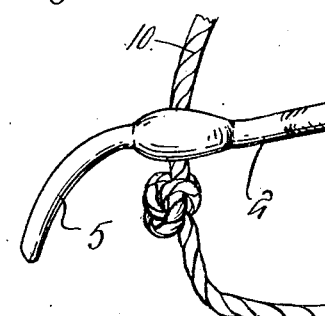
Witness
By
Attorneys.

UNITED STATES PATENT OFFICE.

JOHN BAUER, OF OMEGA, OHIO.

FODDER-TIE.

1,278,092. Specification of Letters Patent. Patented Sept. 10, 1918.

Application filed June 1, 1916, Serial No. 101,110. Renewed April 24, 1918. Serial No. 230,608.

*To all whom it may concern:*

Be it known that I, JOHN BAUER, a citizen of the United States, residing at Omega, in the county of Pike, State of Ohio, have invented certain new and useful Improvements in Fodder-Ties; and I do hereby declare the following to be a full, clear, and exact description of the invention, such as will enable others skilled in the art to which it appertains to make and use the same.

The present invention is directed to improvements in fodder ties, and has for its object to provide a device of this character so constructed that it will positively hold the shock in a compressed state while the twine is being tied around the shock.

A further object of the invention is to provide a device of this character which is exceedingly simple in construction and one which will serve to hold the free end of the compressing twine firmly engaged, but at the same time permitting the free end to be disengaged when desired.

With these and other objects in view, this invention resides in the novel features of construction, formation, combination and arrangement of parts to be hereinafter more fully described, claimed and illustrated in the accompanying drawing, in which:—

Figure 1 is a front elevation of the device.

Fig. 2 is a rear elevation thereof.

Fig. 3 is a top plan view.

Fig. 4 is a detailed perspective view of one end of the device.

The device consists of a longitudinally curved body 1 formed of a pair of space bars, the ends of which converge to provide shanks 2 and 3, the former terminating in an eye adjacent which are arranged the diverging fingers 5.

The shank 3 terminates in a hook 6, having a lug 7 carried thereby, and is further provided with an inclined finger 8 which extends longitudinally of the shank 3 so as to provide a wedge shaped slot 9.

It will be noted that the body 1 is of skeleton formation so that the device will be exceedingly light, but at the same time retaining great strength. Since the body 1 is curved it is obvious that the convex side thereof will engage the shock when the same is in position thereon.

The twine 10 has one end knotted so that said end will be prevented from being disconnected from the eye 4. The free end of the twine, after being passed around the shock is engaged around the hook 6 beneath the lug 7 and is wedgingly engaged in the slot 9, thus holding the twine firmly engaged with the shock. The lug 7 serves to prevent the twine from moving upwardly on the hook 6.

After the twine 10 is passed around the shock the knotted end is drawn outwardly and engaged between the fingers 5, thereby holding the twine tightly engaged with the shock.

In use the device is placed in engagement with the shock and twine 10 passed therearound, after which said twine is drawn tightly into engagement with the shock and engaged with the hook 6 and slot 9. After this has been done the usual twine is passed around the shock and the body 1 removed with the twine 10. Thus it will be seen that the shock can be tightly compressed previous to the application of the usual twine.

What is claimed is:—

A device for binding shocks of fodder comprising a body including spaced bars having their adjacent ends converging to form shanks, one of which is provided with an eye and diverging fingers adjacent said eye for securing one end of a tying element, the other shank terminating in a hook having a projecting lug and also a finger extending therefrom longitudinally of said shank to form a slot therebetween, the tying element being adapted to be engaged with said hook beneath said lug and in said slot.

In testimony whereof, I affix my signature, in the presence of two witnesses.

JOHN BAUER.

Witnesses:
A. L. HALLBERG,
J. A. BLAND.

*Copies of this patent may be obtained for five cents each, by addressing the "Commissioner of Patents, Washington, D. C."*